United States Patent
Nevarez

[15] 3,669,401
[45] June 13, 1972

[54] FIBER GLASS REINFORCED MOLD FOR CEMENTITIOUS BUILDING

[72] Inventor: Ricardo J. Ocampo Nevarez, Mexico City, Mexico

[73] Assignee: Joseph Abelow, Miami Beach, Fla.

[22] Filed: March 13, 1970

[21] Appl. No.: 19,429

[52] U.S. Cl. .............................249/27, 25/130 A, 249/134
[51] Int. Cl. .........................................................E04g 11/02
[58] Field of Search ...................249/1, 13, 27, 28, 134, 193, 249/192, 144, 146, 152, 178; 25/DIG. 26, 130 A, 130 B, 130 S

[56] References Cited

UNITED STATES PATENTS

| 3,490,729 | 1/1970 | Luce et al. | 249/27 |
| 1,228,037 | 5/1917 | McKay | 249/193 |
| 3,317,178 | 5/1967 | Kreier | 249/134 |

*Primary Examiner*—J. Spencer Overholser
*Assistant Examiner*—Lucius R. Frye
*Attorney*—Clarence A. O'Brien and Harvey B. Jacobson

[57] ABSTRACT

A mold form of plastic material for forming a building of cementitious material having structural features which enable its re-use and being constructed of fiber glass reinforced polyester resin with reinforcing elements incorporated therein to provide sufficient strength requirements to effectively form a concrete building.

10 Claims, 9 Drawing Figures

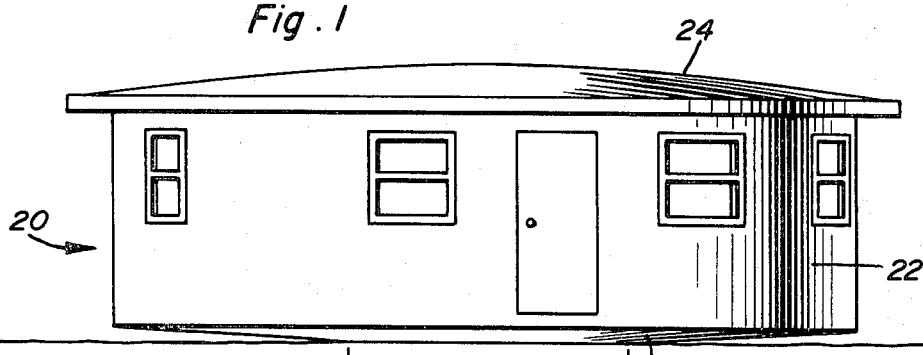
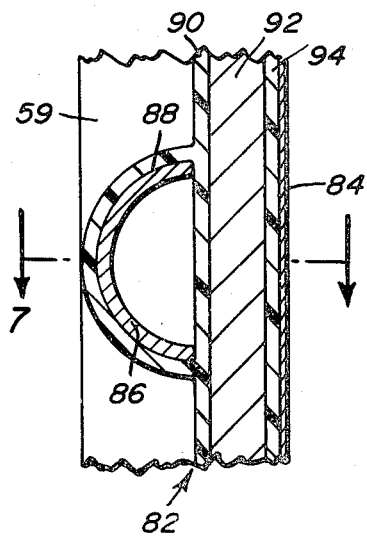
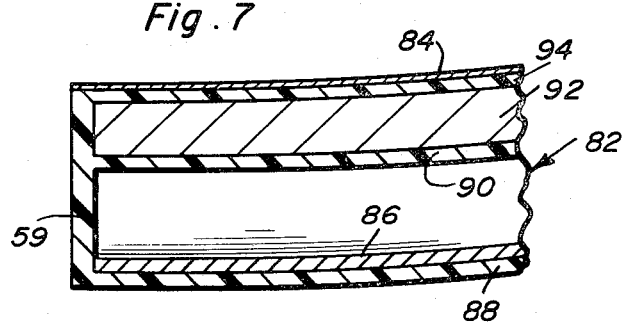
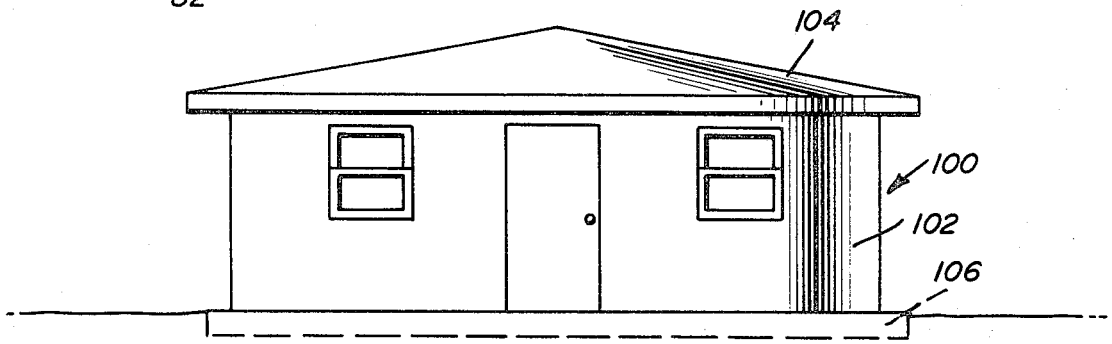
Ricardo J. Nevarez (Ocampo)
INVENTOR.

Ricardo J. Nevarez (Ocampo)
INVENTOR.

PATENTED JUN 13 1972

Ricardo J. Nevarez (Ocampo)
INVENTOR.

FIBER GLASS REINFORCED MOLD FOR CEMENTITIOUS BUILDING

The invention disclosed herein represents improvements disclosed in my prior U.S. Pat. No. 3,436,052, issued Apr. 1, 1969 and my copending applications Ser. No. 811,470, filed Mar. 28, 1969 now U.S. Pat. No. 3,514,909 issued June 2, 1970 and Ser. No. 811,476, filed Mar. 28, 1969 now U.S. Pat. No. 3,597,513 issued Aug. 3, 1971.

The present invention generally relates to building structures of cementitious material such as concrete and more particularly to a mold or form employed in constructing such buildings with the mold or form being re-usable and constructed of reinforced plastic material.

In the prior patent and copending applications, there is disclosed a building, mold therefor and a procedure to construct buildings in which the mold is of metallic material which performs successfully. However as an improvement, reinforced plastic material is employed in the forms with the plastic material preferably being polyester reinforced by glass fibers and provided with rigidifying integral reinforcing tubular elements formed in the mold or form with the surface of the form engaging the concrete being provided with a gel coat which is impervious to attack or reaction from the concrete thereby rendering the form relatively light in weight, easy to transport and handle, relatively inexpensive to manufacture and to use, effective for its purpose and enabling considerable savings in initial cost, time of installation and life expectancy of the molds.

The mold of the present invention may be employed for the construction of a monolithic building similar to that disclosed in my aforementioned patent or for the construction of a monolithic wall and roof assembly on a previously formed slab or other similar supporting surface. Moreover, the present invention may be employed to form a building of any shape and configuration employing either the monolithic, cantilever construction or the monolithic wall and roof construction mounted on a slab.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view illustrating a monolithic cantilever type building constructed by employing the mold of the present invention.

FIG. 6 is a detailed sectional view, on an enlarged scale, illustrating a reinforcing rib incorporated into the mold.

FIG. 7 is a detailed sectional along section line 7—7 of FIG. 6 illustrating further structural details of the reinforcing rib on the mold.

FIG. 8 is a side elevational view illustrating a monolithic wall and roof structure supported from a slab employing the mold of the present invention.

Figure 2:
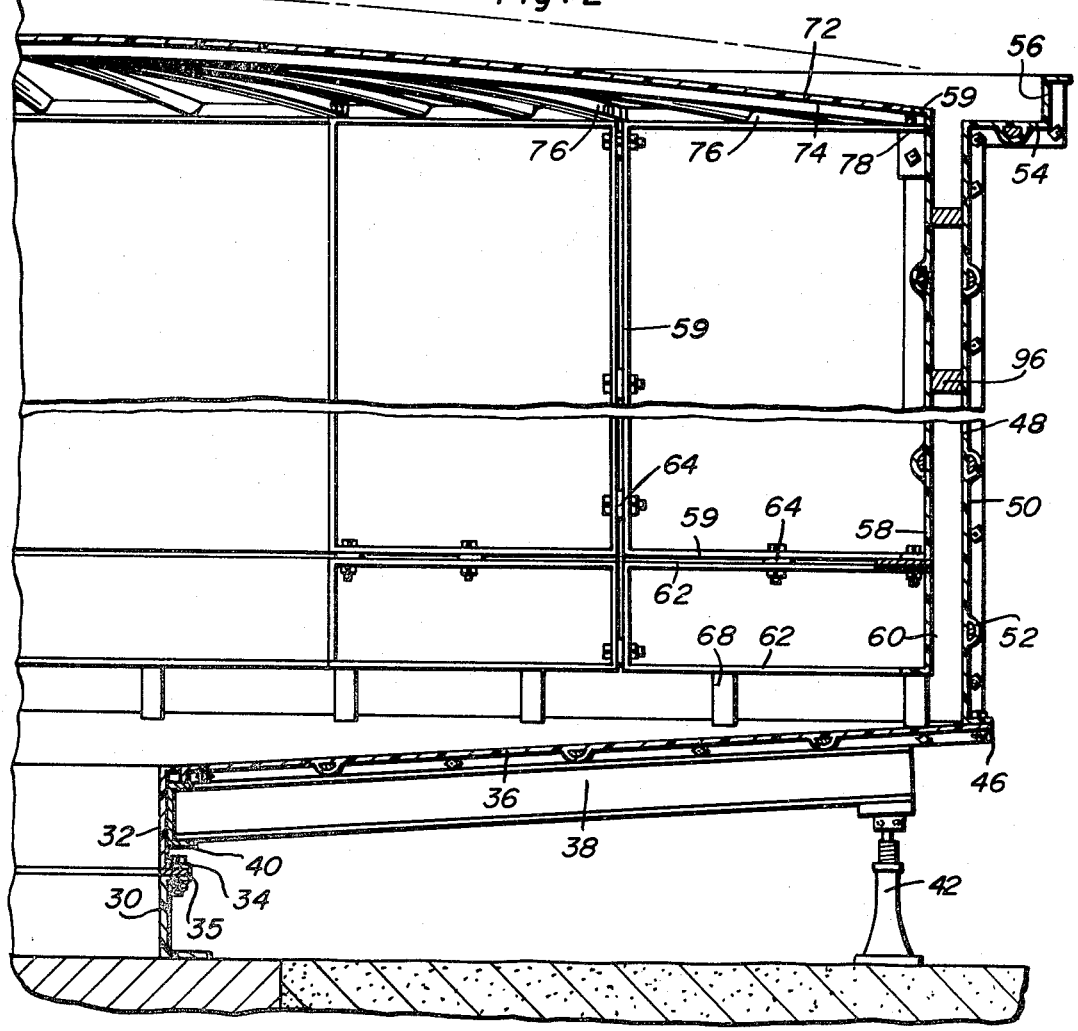
FIG. 2 is a vertical sectional view of the mold illustrating the structural details thereof.

Referring now specifically to the drawings, the building structure illustrated in FIG. 1 is generally designated by numeral 20 and includes a peripheral wall 2, a shallow dome-shaped roof 24, a floor 26 and a central pedestal 28 forming the support for the building structure with the floor 26 being cantilevered from the pedestal 28. The shape and size relationships of the pedestal and floor may be varied as may be the shape and size of the wall 22 and the roof 24. This structure is substantially the same as that disclosed in prior U.S. Pat. No. 3,436,052 in that all of the components are constructed on monolithic or one-piece unitary construction of reinforced concrete in which all of the components are formed simultaneously by a single pour of concrete. While the building structure illustrated is of cylindrical configuration and is illustrated as a single unit, other configurations such as rectangular, square or the like may be employed and fall within the purview of this invention. Also, multiple units may be formed and interconnected by any suitable connecting passageways as deemed appropriate for the particular requirements and individual installation. The building structure is especially useful as dwelling houses and may be constructed at a very low cost and with very little maintenance and upkeep being required.

All of the details of the building itself including the positioning of the reinforcement rods are disclosed in the prior patent with the present invention being directed to the structural details of the mold employed in forming the building structure 20.

The mold includes means forming the pedestal 28 comprising a pair of segmental peripheral forms 30 and 32 each of which has a peripheral flange 34. Spacers 35 are provided between adjacent flanges 34 which are interconnected to enable disassembly of the peripheral forms 30 and 32 which form the central pedestal 28 and which may be cylindrical, rectangular or any other shape or configuration.

Extending outwardly from the cylindrical form 32 is a plurality of floor defining panels 36 which are supported by a plurality of radially extending I-beam structural members 38 which have their inner ends supported from a bracket 40 carried by the upper form 32. The outer end of the I-beam structural member 38 is adjustably supported by an adjustable support 42 such as a screw-thread jack or the like which enables the floor panels 36 to be accurately and properly oriented to provide a level construction for the floor of the building.

The panels 36 each have a peripheral downturned radial flange 44 and the inner and outer edges of the panels 36 also have downturned flanges as at 46 thus serving to rigidify the peripheral edges of the panels with the flanges 44 being detachably connected. Disposed along the undersurface of the panel in a grid pattern is a plurality of reinforcing ribs 48 which are typically illustrated in FIGS. 6 and 7 and will be described hereinafter. The inner flange 46 on the panels 36 are secured in place in any suitable manner such as being engaged with the top inner edge of the beam 36 as illustrated in FIG. 2.

Extending upwardly from the outer edge of the panels 36 is an outer segmental wall panel 48 having peripheral flanges 50 and reinforcing ribs 52 on the exterior surface thereof. The upper edge of the exterior wall forming panels 48 is provided with an offset overhang supporting panel 54 and a vertical overhang forming panel 56 all of one-piece construction with the vertical outside wall panels 48.

Figure 3:
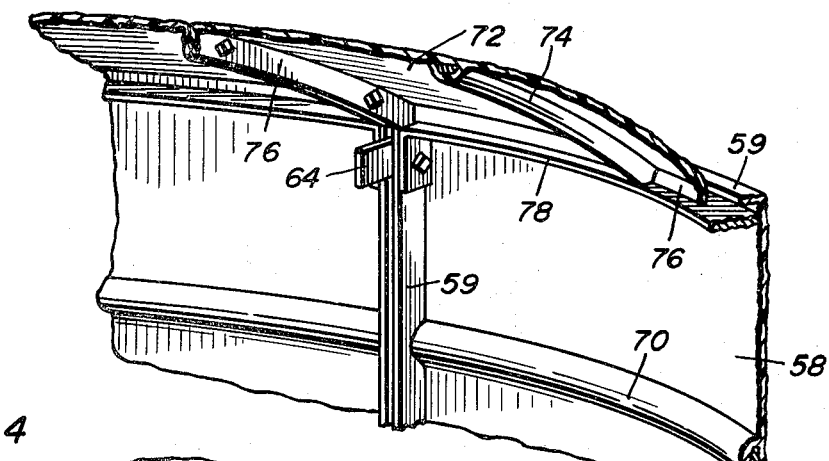
FIG. 3 is a perspective view of the juncture between the vertical wall panels and roof panels of the mold.
Figure 4:
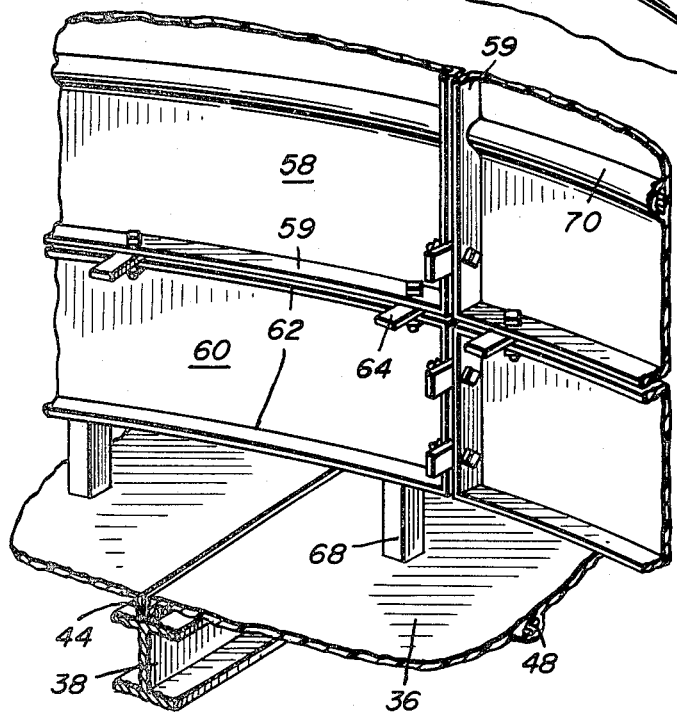
FIG. 4 is a perspective view illustrating the construction of the inner vertical wall panels and the floor panels of the mold.
Figure 5:
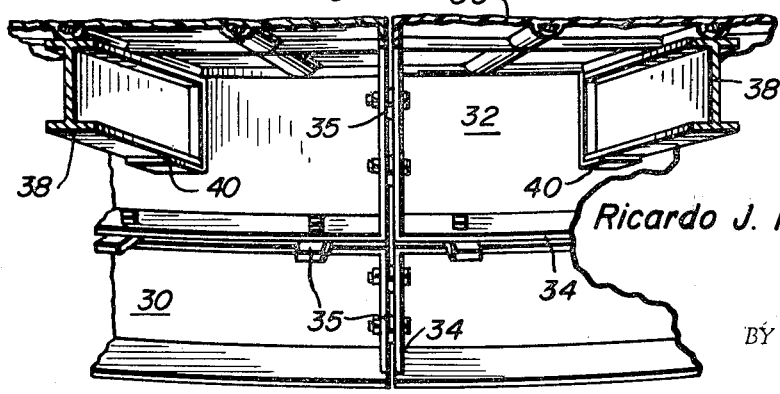
FIG. 5 is a vertical sectional view of the floor panel illustrating the structural features thereof.

Supported from the floor panels 36 is a plurality of inside wall forming panels 58 having a peripheral flange 59. A detachable lower panel 60 is connected to each panel 58 by the peripheral flange 62 thereon with spacers 64 disposed therebetween which enable inward collapse of the inner wall forming panels 58 after the building has been formed. The bottom flange 62 on the lower panel 60 is supported from the floor panels 36 by spacers 68 which may be in the form of tubular members or the like which are expendable by virtue of being left in the concrete when formed. With the spacers 68 being all the same length and resting on the adjusted floor panels 36, the inside wall forming panels 58 and 60 will be effectively and accurately supported with the segments of the inside wall panels 58 being secured together by mating flanges 59 and suitable fastener elements extending therethrough with spacers 64 disposed thereon. Also, the interior surface of the wall forming panels 58 are provided with reinforcement ribs 70 as illustrated in FIGS. 3 and 4.

Supported from the upper end of the inner wall panels 58 is a plurality of roof forming panels 72 each of which has reinforcing ribs 74 on the undersurface thereof and a peripheral depending flange 76 which are connected together by suitable removable fasteners and spacers if necessary. The edges of the roof forming panels 72 are supported from the upper ends of the wall forming panels 58 by a supporting bracket structure 78 of any suitable construction which may be attached to the vertical flanges 59 on panels 58 with the depending flange 76 resting on bracket 78 and the top flange 50 on panels 58 generally aligned with the upper surface of panels 72.

Figure 9:
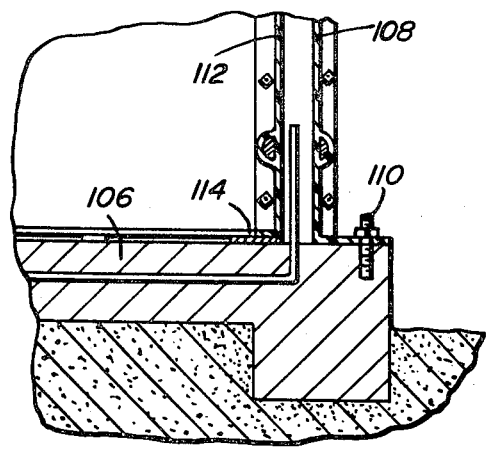
FIG. 9 is a detailed section view illustrating the relationship of the inner and outer wall forming panels and the slab.

FIGS. 6 and 7 illustrate the details of one of the panels all of which are constructed of a sandwich panel 82 of glass fiber reinforced polyester resin having a gel coat 84 on the surface thereof which faces the concrete material with the gel coat not being deteriorated by the concrete since there will be no reaction between the concrete and gel coat. On the outer surface of each panel, reinforcement ribs are provided with each rib being defined by a tubular member 86 which may be a semi-cylindrical tube that is enclosed in and embedded in a coating of a glass fiber reinforced polyester resin 88 as illustrated in FIG. 6. The ends of the semi-cylindrical tubes are closed by the flanges such as flange 59 with the height of the ribs being substantially the same as the flanges and serving as a lighweight reinforcement for rigidifying the fiber glass reinforced polyester panels 82. Inwardly of the tubular member 86 is a layer of reinforced resin 90, a filler material 92 and reinforced resin 94 on which the gel coat 84 is disposed. The filler material 92 may be honeycomb material, particle board, balsa wood, foam plastic or other lightweight material which will strengthen the mold. Also, the reinforcing tubes 86 may be lightweight solid material of a similar shape and rigidity.

Where window openings or door openings are to be provided, the inner mold or inner wall panels will have appropriately sized wood members 96 mounted thereon which define the opening desired with the flanges extending to and engaging the inner surface of the outer wall panels so that the outer wall panels will all be continuous except for where an opening is to be provided to enable access to the interior of the building during construction thereof which will be a doorway which is formed by the appropriate outer wall panel merely having an opening therein conforming with the wood members mounted on the inner wall panel which will also have a corresponding opening therein. The center of the roof forming panels may be supported by scaffolding or bracing and partition walls may be formed by appropriately positioned partition forming panels which are connected with the inner wall panels and communicated therewith. With this construction, employing concrete having appropriate flow characteristics, appropriately positioned reinforcing rods, vibrators and by following appropriate techniques, the complete building may be poured in a single pour.

Where a slab-type structure is to be employed or a footing is to be employed at the periphery of the building, such as illustrated in FIG. 8, the building is generally designated by the numeral 100 and includes a wall panel 102 and a roof panel 104 of unitary monolithic construction with the wall panel resting on a footing or slab 106. In this construction, the outer wall panels 108 are attached to the upper surface of the slab by a suitable fastener arrangement 110. The inner wall panels 112 are also supported from the slab or footing with suitable fasteners or the like and spacers 114 are provided between the inner wall panels 112 and the slab 106 in order to provide space to enable collapse or removal of the inner wall panels 112. Other than elimination of the floor forming panels 36, the central pedestal forming panels and the supporting structure for the floor supporting panels 36, the remainder of the structure of the mold and the remainder of the structure of the building in FIGS. 8 and 9 is the same as that in the monolithic embodiment illustrated in FIGS. 1-7.

In constructing the molds, various thickness of materials may be employed with the molds being arcuate to the degree required for the particular diameter or curvature of radius of a cylindrical or curved wall house that is being constructed. Other shapes and configurations of houses or buildings may be formed by correspondingly shaping the molds with the segments of the molds being of a size to facilitate handing and transport thereof with the smooth interior gel coat preventing adherence between the molds and the concrete from which the building is constructed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A mold for forming a reinforced concrete building construction comprising an inner sectional wall supported from a supporting surface, an outer sectional wall supported from the supporting surface in substantially concentric spaced relation to the inner wall, a plurality of segmental roof sections connected to each other and supported from the upper edge of the inner wall, and spacers disposed between the peripheral edge portions of at least some of the inner wall segments to enable removal thereof, all of the wall and roof sections being constructed of glass fiber reinforced plastic material, said supporting surface being in the form of an inclined sectional bottom wall constructed of glass fiber reinforced plastic material and defining a support for a floor of a building structure and expendable spacers supporting the inner sectional wall from the supporting surface.

2. The structure as defined in claim 1 wherein each section of the bottom wall is provided with a depending peripheral flange, each of the sections of the bottom wall extending radially outwardly with the flanges on opposite side edges of the bottom sections extending radially and being joined together, radially extending support members underlying the sectional bottom wall and supporting the same in inclined position.

3. The structure as defined in claim 2 wherein said support members are in the form of beams, adjustable jacks supporting the outer ends of the beams for vertical adjustment thereof for varying the inclination of the bottom wall, and means supporting the inner end of the beams.

4. The structure as defined in claim 3 wherein said means supporting the inner ends of said beams includes a bracket structure, a peripheral pedestal forming wall disposed centrally of the sectional bottom wall with the inner edges of the bottom wall sections terminating flush with the upper edge of the peripheral pedestal forming wall, said bracket structure being supported from the pedestal forming wall.

5. The structure as defined in claim 1 wherein all of the wall and roof sections are constructed of a sandwich panel including an inner gel coat, a layer of glass fiber reinforced plastic material, a layer of lightweight filler material for increasing the rigidity of the panel, and an exterior layer of glass fiber reinforced plastic material forming a sandwich panel with the layer of filler material being substantially thicker than the gel coat and layers of plastic material for increasing the rigidity without materially increasing the weight.

6. The structure as defined in claim 5 together with reinforcing ribs incorporated into the exterior layer of glass fiber reinforced plastic material.

7. The structure as defined in claim 6 wherein said ribs are constructed of substantially semi-tubular members embedded and coated by the exterior layer of glass fiber reinforced plastic material.

8. The structure as defined in claim 1 wherein the outer sectional wall includes an outwardly extending flange at the lower edge thereof, said outwardly extending flange being supported on and secured to the upper surface of the sectional bottom wall, and members extending between the sectional walls to define a periphery of an opening extending through the wall of a building being formed in the mold.

9. A mold for forming a reinforced concrete building construction comprising an inner sectional wall supported from a supporting surface, an outer sectional wall supported from the supporting surface in substantially concentric spaced relation to the inner wall, a plurality of segmental roof sections connected to each other and supported from the upper edge of the inner wall, and spacers disposed between the peripheral edge portions of at least some of the inner wall segments to enable removal thereof, spacers interposed between the supporting surface and the inner wall to enable stripping of the inner wall and accurate positioning of the inner wall and roof sections supported therefrom, the lower edge of the outer wall including flange means projecting outwardly therefrom, said flange means being supported on and secured to the supporting surface.

10. The structure as defined in claim 9 together with members extending between the sectional walls to define a periphery of an opening extending through the wall of a building being formed in the mold, all of the wall and roof sections being constructed of a sandwich panel including an inner gel coat, a layer of glass fiber reinforced plastic material, a layer of lightweight filler material for increasing the rigidity of the panel, and an exterior layer of glass fiber reinforced plastic material forming a sandwich panel with the layer of filler material being substantially thicker than the gel coat and layers of plastic material for increasing the rigidity without materially increasing the weight.

* * * * *